United States Patent
Schenk

(10) Patent No.: US 6,381,623 B1
(45) Date of Patent: Apr. 30, 2002

(54) METHOD FOR ADAPTIVE FILTER ADJUSTMENT IN A QAM/CAP SYSTEM

(75) Inventor: Heinrich Schenk, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/326,365

(22) Filed: Jun. 4, 1999

(30) Foreign Application Priority Data

Jun. 4, 1998 (EP) .............................. 98110218

(51) Int. Cl.[7] .............................................. G06F 17/10
(52) U.S. Cl. ...................................................... 708/322
(58) Field of Search ................................ 708/322–323; 375/232, 235

(56) References Cited

U.S. PATENT DOCUMENTS

| | | | | |
|---|---|---|---|---|
| 5,809,074 A | * | 9/1998 | Werner et al. | 708/323 |
| 5,835,731 A | * | 11/1998 | Werner et al. | 708/323 |
| 6,075,816 A | * | 6/2000 | Werner et al. | 708/323 |
| 6,252,903 B1 | * | 6/2001 | Werner et al. | 708/323 |

FOREIGN PATENT DOCUMENTS

| | | |
|---|---|---|
| EP | 0748124 A2 | 12/1996 |
| EP | 0806854 A2 | 11/1997 |
| EP | 0831622 A2 | 3/1998 |

OTHER PUBLICATIONS

"The Multimodulus Blind Equalization Algorithn", J. Yang et al., IEEE 1997, pp. 127–130.*
"Three–Dimensional Equalization for the 3–D QAM System with Strength Reduction", Ahmed F. Shalash et al., IEEE 1998, pp. 453–455.*
"Multimodulus Blind Equalization Algorithn", J. Yang et al., IEEE 1997, pp. 127–130.
"Three–Dimensional Equalization for the 3–D QAM System with Strength Reduction", Ahmed F. Shalash et al., IEEE 1998, pp. 453–455.
"Standards Project: Study of the feasibility and advisability of digital subscriber lines operating at rates substantially in excess of the basic access rate", W.Y. Chen et al., Aug. 19, 1992, pp. 1–28.

* cited by examiner

*Primary Examiner*—Tan V. Mai
(74) *Attorney, Agent, or Firm*—Herbert L. Lerner; Laurence A. Greenberg; Werner H. Stemer

(57) ABSTRACT

The QAM/CAP (quadrature amplitude modulation, carrierless amplitude/phase modulation) receiver has an analog-to-digital converter, a digital level regulator, an adaptive reception filter pair, and a downstream decision maker. The coefficients of the filter pair of the QAM/CAP receiver are adaptively adjusted in that the $n^{th}$ filter coefficient of a filter in the $i^{th}$ adjustment step is reduced by a correction value by the filter coefficient of the previous adjustment step $i-1$. The correction value is the product of a distortion elimination error, a delayed input value, and a manipulated variable $\gamma$.

11 Claims, 1 Drawing Sheet

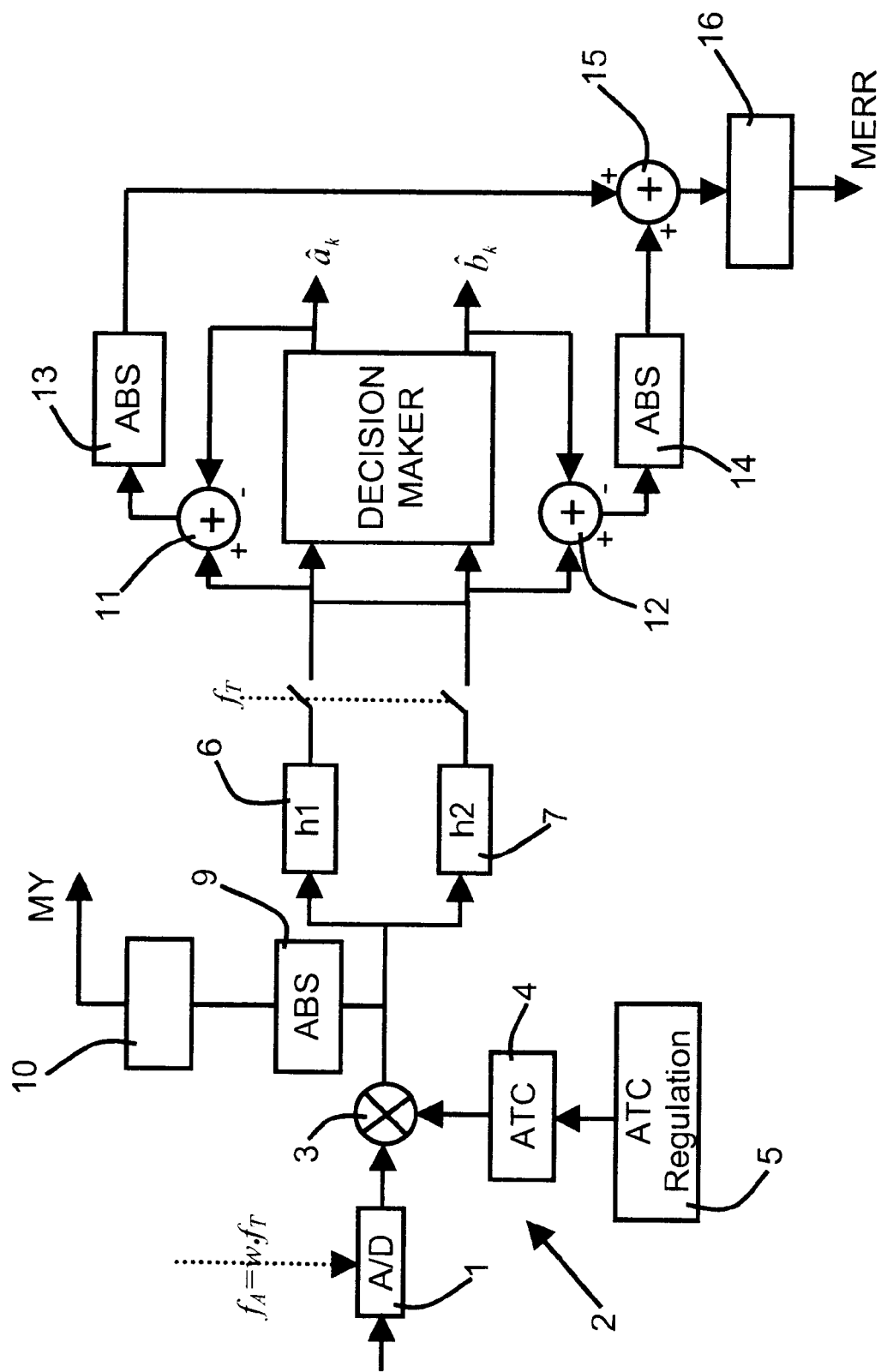

METHOD FOR ADAPTIVE FILTER ADJUSTMENT IN A QAM/CAP SYSTEM

BACKGROUND OF THE INVENTION

FIELD OF THE INVENTION

The invention lies in the telecommunications field. More specifically, the invention relates to a method for adaptive filter adjustment in a QAM/CAP system, and to a corresponding CAP receiver.

Reference is had to the article by Chen et al. entitled "Design of Digital Carrierless AM/PM Transceivers" from AT&T and Bellcore, TEI.1.4/92-149, Aug. 19, 1992. The article provides an introduction to the design of digital, carrierless CAP transceivers and receivers. It will not be necessary to repeat that information herein and, accordingly, the basic structures will be described only briefly here.

It has been found that, with large amounts of data, a frequency-division multiplex method is better than a baseband duplex channel method (common-frequency method) with echo compensation for duplex data transmission via subscriber access lines, despite the greater bandwidth required. The crosstalk that is dominant in the relevant speed range can be suppressed by selective filtering. Thus, for rapid data transmission in the telephone subscriber access area, single-carrier methods such as QAM (quadrature amplitude modulation) and CAP (carrierless amplitude/phase modulation) are currently being discussed under the keyword VDSL (very high bit rate digital subscriber line). They allow the various frequency bands to be achieved for the outbound and inbound return directions in a simple manner by suitable selection of the carrier and mid-frequencies. The data rates in this case vary over a range from about 2 Mbit/s to 50 Mbit/s. Both symmetrical and asymmetric operation are intended to be possible. Symmetrical operation means equal data rates in both directions, which is generally required for commercial applications. Asymmetric operation means different data rates in the two directions. The latter is generally sufficient in private communication (high data rate to the subscriber, low data rate from the subscriber to the service provider).

Until now, the discrete multitone method has been standardized in the ADSL Standard (ADSL=asymmetric digital subscriber line). However, it can be assumed that single-carrier methods using CAP technology will also be standardized in the pertinent application area.

In a CAP system, the binary data are assembled into groups of L bits at the transmission end, and are supplied to a coder. The coder allocates a point in a two-dimensional signal space to each of the $2^L$ combinations. The point is defined by the cartesian coordinates (x, y). The signal point may also be regarded as a point in the complex number planes.

A CAP modulator will be considered first of all. The signal points to be transmitted, defined by the two cartesian coordinates $a_k$ and $b_k$ at the time kT, are sampled at the clock rate (symbol rate) $f_T=1/T$ and are passed to separate sub-channels. Each of the sub-channels contains a transmission filter. After this, the signals in the two sub-channels are added, and the transmission signal is passed to the transmission channel.

In a corresponding CAP receiver, which forms the matching element to the CAP transceiver, the received input signal is subjected to A/D conversion at a predetermined sampling rate. After the digital A/D conversion, digital level regulation is carried out, in order to adjust the level of the received/wanted signal to a constant value so that, as far as possible, it is independent of the transmission line and of the crosstalk of the transmission signal in the system, as well as all other out-band interference. After digital level regulation, the samples are passed to a pair of parallel reception filters. In this case, the coefficients of the filter pair must be adjusted adaptively, starting with a fixed coefficient set, which is designed for a specific line length. After reception filtering, the signal values are sampled at the symbol rate, and are passed to a decision maker. The decision maker has the task of assigning received data to each received value pair. Once adjustment has been carried out and if the interference is sufficiently low, these received values match the transmitted data values, apart from a constant delay and an additional rotation of the complex data vector through ±90° or ±180°.

A QAM/CAP system offers the possibility to carry out the channel distortion elimination with the pair of filters that are required in any case for demodulation. These are designed as a Hilbert transformer. The coefficients of the filter pair must be adjusted adaptively for this purpose.

In actual transmission systems, the signal at the input of the receiver is in principle composed of two elements, namely the wanted band signal with in-band interference as well as out-band interference. Out-band interference relates primarily to echoes from the system's own transmitter, whose spectral elements are in the adjacent frequency band, and signals in the low-frequency range, which originate from services that use the same transmission frequency, such as ISDN.

In-band interference causes symbol errors directly, depending on the intensity and the stepped nature of the transmission. The errors can in turn be reduced to a limited extent by suitable coding measures. Out-band interference, on the other hand, can be largely suppressed by suitable selective filters. For complexity reasons, it is worthwhile to carry out both analog initial filtering and digital filtering with the reception filter pair in the QAM/CAP system.

In unfavorable applications, for example in the case of long transmission lines with a high cable losses, the proportion of out-band interference may be greater than the wanted signal despite analog initial filtering at the input of the digital receiver. The reception filter pair must thereby compensate for the linear distortion in the channel and filter out the remaining out-band interference by a sufficiently high level of stop-band attenuation.

The superimposed out-band interference, however, has a negative effect on the process of adjusting the filter pair, since, for coefficient adjustment, the input signal must be correlated with a suitable error criterion.

SUMMARY OF THE INVENTION

It is accordingly an object of the invention to provide a method for adaptive filter adjustment in a QAM/CAP system, which overcomes the above-mentioned disadvantages of the heretofore-known devices and methods of this general type and which ensures that the filter pair in the QAM/CAP system settles in a stable manner despite out-band interference, and of providing a corresponding CAP receiver.

With the foregoing and other objects in view there is provided, in accordance with the invention, a method for adaptive filter adjustment of a filter pair of a QAM/CAP receiver, which comprises:

providing an A/D converter, a digital level regulator, an adaptive reception filter pair, and a decision maker connected downstream thereof in a signal flow direction;

defining a correction value as a product of a distortion elimination error, a delayed input value, and a manipulated variable γ; and forming an $n^{th}$ filter coefficient of a filter in an $i^{th}$ adjustment step of the filter from the filter coefficient of a preceding adjustment step i-1 reduced by the correction value.

In other words, the objects are satisfied with an adaptive filter adjustment of the coefficients of the adaptive filter pair in that the $n^{th}$ filter coefficient of a filter in the $i^{th}$ adjustment step of the filter is formed by the filter coefficient of the previous adjustment step reduced by a correction value. The correction value is the product of the distortion elimination error, the delayed input value, and the manipulated variable γ.

In accordance with an added feature of the invention, the manipulated variable γ is the reciprocal value of a power of two, i.e., it is $\gamma=2^{-\eta}$.

In accordance with an additional feature of the invention, the manipulated variable γ is controlled as a function of an instantaneous mean absolute error.

In accordance with another feature of the invention, the manipulated variable γ is chosen to be smaller the smaller the mean absolute error.

In accordance with a further feature of the invention, the manipulated variable γ is controlled as a function of an out-band interference, using a mean absolute value of the signal following the control amplifier and prior to the filters as a control criterion.

In accordance with again an added feature of the invention, the manipulated variable γ is chosen to be smaller the greater the mean absolute value.

The reception filter pair used in the receiver thus provides separation of the two transmitted components, channel distortion elimination and suppression of the out-band interference by selective filtering. The coefficients of the reception filter pair must readjust themselves adaptively to the present transmission channel, based on a defined initial solution. The LMS algorithm (Least Mean Square) may be used as the adjustment algorithm. The adjustment rule is then as follows:

$$h_{1n}(i)=h_{1n}(i-1)-\gamma \cdot \{y(k-n)\} \cdot \{\Delta \hat{a}_k\} \quad (1a)$$

$$h_{2n}(i)=h_{2n}(i-1)-\gamma \cdot \{y(k-n)\} \cdot \{\Delta \hat{b}_k\} \quad (1b)$$

In this case, y(k) is the received signal, $h_1$ the filter set for the first filter, and $h_2$ the filter set of the second filter.

In order to avoid real multiplications, modifications of the above adjustment rule may be used, in which only the mathematical sign of the samples and/or the mean absolute error are/is used:

$$h_{1n}(i)=h_{1n}(i-1)-\gamma \cdot SGN\{y(k-n)\} \cdot \{\Delta \hat{a}_k\} \quad (2a)$$

$$h_{2n}(i)=h_{2n}(i-1)-\gamma \cdot SGN\{y(k-n)\} \cdot \{\Delta \hat{b}_k\} \quad (2b)$$

or $$h_{1n}(i)=h_{1n}(i-1)-\gamma \cdot \{y(k-n)\} \cdot SGN\{\Delta \hat{a}_k\} \quad (3a)$$

$$h_{2n}(i)=h_{2n}(i-1)-\gamma \cdot \{y(k-n)\} \cdot SGN\{\Delta \hat{b}_k\} \quad (3b)$$

or $$h_{1n}(i)=h_{1n}(i-1)-\gamma \cdot SGN\{y(k-n)\} \cdot SGN\{\Delta \hat{a}_k\} \quad (4a)$$

$$h_{2n}(i)=h_{2n}(i-1)-\gamma \cdot SGN\{y(k-n)\} \cdot SGN\{\Delta \hat{b}_k\} \quad (4b)$$

For circuitry reasons relating to the implementation, it is advantageous, as noted above, to choose the reciprocal value of a power of two for the manipulated variable, that is to say:

$$\gamma=2^{-\eta} \quad (5)$$

This manipulated variable must be matched to the choice of adjustment rule. For stability reasons, it should not exceed a specific value. When choosing the manipulated variable, it must be remembered that the accuracy of the coefficient adjustment rises if the manipulated variable is relatively small, but the coefficient word length, and thus the implementation complexity and the adjustment time, likewise rise as well. In order to minimize the adjustment time, it is advantageous to vary the manipulated variable as a function of the present mean error value. The process thereby starts with a maximum manipulated variable (minimum η). Depending on the mean error value, the value of η is in each case incremented by one, until the maximum value of η (minimum value of γ) is reached.

The signal y(k) contains both the useful signal from the other station and the out-band interference. In extreme cases, this interference may be greater than the wanted signal. In order to achieve an optimum behavior in this application as well, the manipulated variable must also be matched to the out-band interference. In this case, the manipulated variable must be reduced as the out-band interference increases.

For automatic adaptation of the manipulated variable, it is first necessary to generate a criterion for the magnitude of the out-band interference. According to this invention, this criterion is derived at the output of the digital control amplifier. The control amplifier must in this case control the received level such that the level of the wanted signal at the output of the filter pair is roughly constant, irrespective of the line length and the out-band interference. The adjustment criterion for the control amplifier must therefore be derived from the filter out-put values. The filter input signal y(k) is then composed of the wanted signal, at a roughly constant level, and the out-band interference. By averaging the absolute values of y(k), it is thus possible to deduce the intensity of the out-band interference, and to adapt the manipulated variable for coefficient adjustment.

With the above and other objects in view there is also provided, in accordance with the invention, an adaptive CAP receiver for carrying out the above-summarized method.

Other features which are considered as characteristic for the invention are set forth in the appended claims.

Although the invention is illustrated and described herein as embodied in method for adaptive filter adjustment in a QAM/CAP system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole FIGURE is a schematic block diagram of the CAP receiver configuration.

DESCRIPTION OF THE PREFERRED EMBODIMENT

Referring now to the sole FIGURE of the drawing in detail, there is seen a block diagram of a CAP receiver with the subsystems for generating the criterion for adjustment of the manipulated variable η. In this case, MY denotes the mean absolute value after the control amplifier, and MERR denotes the mean absolute error after distortion elimination, that is to say after the filter pair.

The analog input signal y(k) is converted in a controllable A/D converter 1, at a sampling frequency $f_A = w \cdot f_T$, into a digital signal y(k). The variable w is an integer greater than one (w>1), for example 4 or 6 or more, and the sampling theorem must be satisfied for the sampling frequency $f_A$. This is followed by automatic adaptation of the signal level in a control amplifier 2 comprising a multiplier 3 and an apparatus 4 for producing the gain factor ATC, as well as a regulator 5. The received signal then passes into the pair of reception filters 6 and 7, which are characterized by appropriate coefficient sets $h_1$, and $h_2$. The filtered signals in the filter branches are then sampled at the symbol frequency $f_T$ and are fed to a decision maker 8, which allocates received data $\hat{a}_k$ and $\hat{b}_k$ to each received value pair.

The mean absolute value MY following the control amplifier 2 is produced by means of an absolute-value generator 9 and a mean-value generator 10. The magnitude of the value is a measure of the out-band interference.

The mean absolute error MERR is produced firstly by forming the differences between the received values before and after the decision maker 8 in the respective filter branch, using appropriate adders 11, 12 then by forming the respective absolute values of the differences in appropriate absolute-value generators 13, 14, in order to produce the absolute individual errors, and by adding the individual errors in a further adder 15. After subsequent averaging in a further mean-value generator 16, the absolute mean error MERR is obtained.

For the choice of the manipulated variable, it must in general be true that:

the greater MY, the smaller the manipulated variable γ and the greater the value of η; and is the smaller MERR, the smaller the manipulated variable γ and the greater the value of η.

The respective current value for the manipulated variable η, which is required in the above equations 1–4 using equation 5, can be determined as follows, with threshold values S1, S2, ..., Sn being defined and used for the level, and E1, E2, ..., Em being defined and used for the mean absolute error:

An initial setting $\eta_0$ is defined in advance.
Calculation of an intermediate value $\eta_1$:

$$\eta_1 = \eta_0$$
$$\text{IF } MY < S1 \Rightarrow \eta_1 = \eta_0 - 1$$
$$\text{IF } MY < S2 \Rightarrow \eta_1 = \eta_0 - 2$$
$$\text{IF } MY < S3 \Rightarrow \eta_1 = \eta_0 - 3$$
$$\vdots$$
$$\text{IF } MY < Sn \Rightarrow \eta_1 = \eta_0 - n$$

where S1>S2>S3 ... >Sn.
Calculation of the variable η:

$$\eta = \eta_1$$
$$\text{If } MERR < E1 \Rightarrow \eta = \eta_1 + 1$$
$$\text{If } MERR < E2 \Rightarrow \eta = \eta_1 + 2$$
$$\text{If } MERR < E3 \Rightarrow \eta = \eta_1 + 3$$
$$\vdots$$
$$\text{If } MERR < Em \Rightarrow \eta = \eta_1 + m$$

where E1>E2>E3 ... >Em.

The required mean values can be generated in each case, for example, by using a recursive, first-order filter.

I claim:

1. A method for adaptive filter adjustment of a filter pair of a QAM/CAP receiver, which comprises:

providing an A/D converter, a digital level regulator, an adaptive reception filter pair, and a decision maker connected downstream thereof in a signal flow direction;

defining a correction value as a product of a distortion elimination error, a delayed input value, and a manipulated variable γ; and forming an $n^{th}$ filter coefficient of a filter in an $i^{th}$ adjustment step of the filter from the filter coefficient of a preceding adjustment step i–1 reduced by the correction value.

2. The method according to claim 1, wherein the manipulated variable γ is the reciprocal value of a power of two.

3. The method according to claim 1, which comprises controlling the manipulated variable γ as a function of an instantaneous mean absolute error.

4. The method according to claim 3, which comprises choosing the manipulated variable γ to be smaller the smaller the mean absolute error.

5. The method according to claim 1, which comprises controlling the manipulated variable γ as a function of an out-band interference, and using a mean absolute value of the signal following the control amplifier and prior to the filters as a control criterion.

6. The method according to claim 5, which comprises choosing the manipulated variable γ to be smaller the greater the mean absolute value.

7. The method according to claim 1, which comprises defining the following adjustment rule:

$h_{1n}(i) = h_{1n}(i-1) - \gamma \cdot \{y(k-n)\} \cdot \{\Delta \hat{a}_k\}$ for the filter with a coefficient set $h_1$; and $h_{2n}(i) = h_{2n}(i-1) - \gamma \cdot \{y(k-n)\} \cdot \{\Delta \hat{b}_k\}$ for the filter with a coefficient set $h_2$;

where y(k) is the received signal.

8. The method according to claim 1, which comprises defining the following adjustment rule:

$h_{1n}(i) = h_{1n}(i-1) - \gamma \cdot \text{SGN}\{y(k-n)\} \cdot \{\Delta \hat{a}_k\}$ for the filter with a coefficient set $h_1$; and $h_{2n}(i) = h_{2n}(i-1) - \gamma \cdot \text{SGN}\{y(k-n)\} \cdot \{\Delta \hat{b}_k\}$ for the filter with a coefficient set $h_2$;

where y(k) is the received signal.

9. The method according to claim 1, which comprises defining the following adjustment rule:

$h_{1n}(i) = h_{1n}(i-1) - \gamma \cdot \{y(k-n)\} \cdot \text{SGN}\{\Delta \hat{a}_k\}$ for the filter with a coefficient set $h_1$; and $h_{2n}(i) = h_{2n}(i-1) - \gamma \cdot \{y(k-n)\} \cdot \text{SGN}\{\Delta \hat{b}_k\}$ for the filter with a coefficient set $h_2$;

where y(k) is the received signal.

10. The method according to claim 1, which comprises defining the following adjustment rule:

$h_{1n}(i) = h_{1n}(i-1) - \gamma \cdot \text{SGN}\{y(k-n)\} \cdot \text{SGN}\{\Delta \hat{a}_k\}$ for the filter with the coefficient set $h_1$; and $h_{2n}(i) = h_{2n}(i-1) - \gamma \cdot \text{SGN}\{y(k-n)\} \cdot \text{SGN}\{\Delta \hat{b}_k\}$ for the filter with a coefficient set $h_2$;

where y(k) is the received signal.

11. An adaptive CAP receiver for carrying out the method of claim 1.

* * * * *